United States Patent [19]
Cornford

[11] 3,841,198
[45] Oct. 15, 1974

[54] GEAR CUTTING MACHINE WITH MEANS FOR CONTINUOUSLY CONTROLLING THE POSITION OF THE TOOL IN ACCORDANCE WITH THE POSITION OF THE CARRIAGE

[76] Inventor: Arthur Selwyn Cornford, 561 Bobolink Rd., Clarkson, Ontario, Canada

[22] Filed: Oct. 2, 1973

[21] Appl. No.: 402,793

Related U.S. Application Data
[63] Continuation-in-part of Ser. No. 202,961, Nov. 29, 1971, abandoned.

[52] U.S. Cl.................. 90/4, 235/151.11, 318/660
[51] Int. Cl........... B23f 5/20, B23f 5/22, B23f 5/24
[58] Field of Search...................... 90/1, 4; 318/660; 235/151.11

[56] References Cited
UNITED STATES PATENTS
3,543,639  1/1970  Hill....................................... 90/13.5
3,555,961  1/1971  Vitushkin et al. ........................ 90/1

FOREIGN PATENTS OR APPLICATIONS
40,286  8/1965  Germany ................................. 90/4

Primary Examiner—Francis S. Husar
Attorney, Agent, or Firm—Ridout & Maybee

[57]  ABSTRACT

Gear teeth are cut on the work face of a large annular workpiece by supporting the workpiece on a stationary mounting structure or foundation and mounting the cutter in a carriage which is guided for movement along the face of the workpiece to be machined and which is adapted to be propelled along said face, the position of the cutter relative to the carriage being continuously controlled in accordance with the position of the carriage so as to ensure a predetermined path of movement of the cutter with respect to the workpiece face. In this way a very accurate control of the cutting operation is maintained without the need for the elaborate and expensive drive systems used in conventional gear cutting machines.

10 Claims, 3 Drawing Figures

GEAR CUTTING MACHINE WITH MEANS FOR CONTINUOUSLY CONTROLLING THE POSITION OF THE TOOL IN ACCORDANCE WITH THE POSITION OF THE CARRIAGE

CROSS REFERENCE TO RELATED APPLICATIONS

This application is a continuation-in-part of my copending application Ser. No. 202961 filed November 29, 1971, for "GEAR CUTTING MACHINES" and now abandoned.

The present invention relates to a system for cutting gear teeth. Machines for cutting gear teeth are conventionally made in such a way that the workpiece or blank is supported in or on the machine so that it may be rotated. The gear cutting tool may be a fixed cutter which performs a shaping operation, or a rotatable cutter such as a milling cutter or a hob. In any case, for good quality gearing produced by a generating method it is usual for the cutter position to have a fixed relation to the angular position of the workpiece or blank so that the compound relative motion of both the cutter and the workpiece results in the generation of the required tooth form. Alternatively when gearing is produced by shaping or milling, using the single index system, it is usual for the cutter position to be accurately determined at each tooth position by an indexing mechanism.

In certain industries such as the mineral dressing industry, the development of very large machines has created a demand for gears of much larger diameter and torque transmission capability than has previously been required. Such gears are required to operate at medium speeds and to transmit high levels of power, and therefore the accuracy of tooth form is very important. Such gears may be as much as forty feet in diameter or larger, and may weigh 100 tons or more. Clearly, to provide a machine table which is capable of supporting the workpiece and, while so doing, to rotate at a steady speed, presents serious mechanical problems. It is usual to coordinate the motions of the cutting tool and of the workpiece by means of a system of shafts and gears, an index wheel being arranged concentric with the workpiece to rotate therewith and being used to sense the rotational position of the workpiece. Disadvantages of this system are that the index wheel has to be very large in order to provide accurate indexing, and is therefore costly, and that the interconnecting shafting is subject, due to its length, to elastic deflection, this affecting the accuracy of the tooth generation adversely. These disadvantages apply equally to generating systems or single index systems.

According to the present invention these disadvantages are overcome by supporting the annular workpiece on a stationary mounting structure or foundation and mounting the cutter in a carriage which is guided for movement along the face of the workpiece to be machined and which is adapted to be propelled along said face. In a hobbing or other generating process, the position of the cutter relative to the carriage is continuously controlled in accordance with the position of the carriage so as to ensure a predetermined path of movement of the cutter with respect to the workpiece face. In this way a very accurate control of the cutting operation is maintained without the need for the elaborate and expensive drive systems used in conventional gear cutting machines.

Since the workpiece is stationary and the cutter is movable, the carriage and the cutter may be driven from a common drive motor, their relative motions being positively controlled by mechanical gearing in the conventional manner without the disadvantage of distortion encountered where higher inertial forces have to be applied. Preferably, however, the carriage and the cutter are driven by independent drive motors, the position of the carriage being continuously monitored and the cutter drive motor being controlled in accordance with such monitoring whereby to maintain a predetermined relationship between the carriage and cutter positions. The arrangement may also be used for single index operations by using the carriage position monitoring system for accurate positioning of the carriage at each tooth location while that tooth is being cut.

In order that the invention may be readily understood, one embodiment thereof will now be described by way of example with reference to the accompanying drawing, in which.

Figure 1:
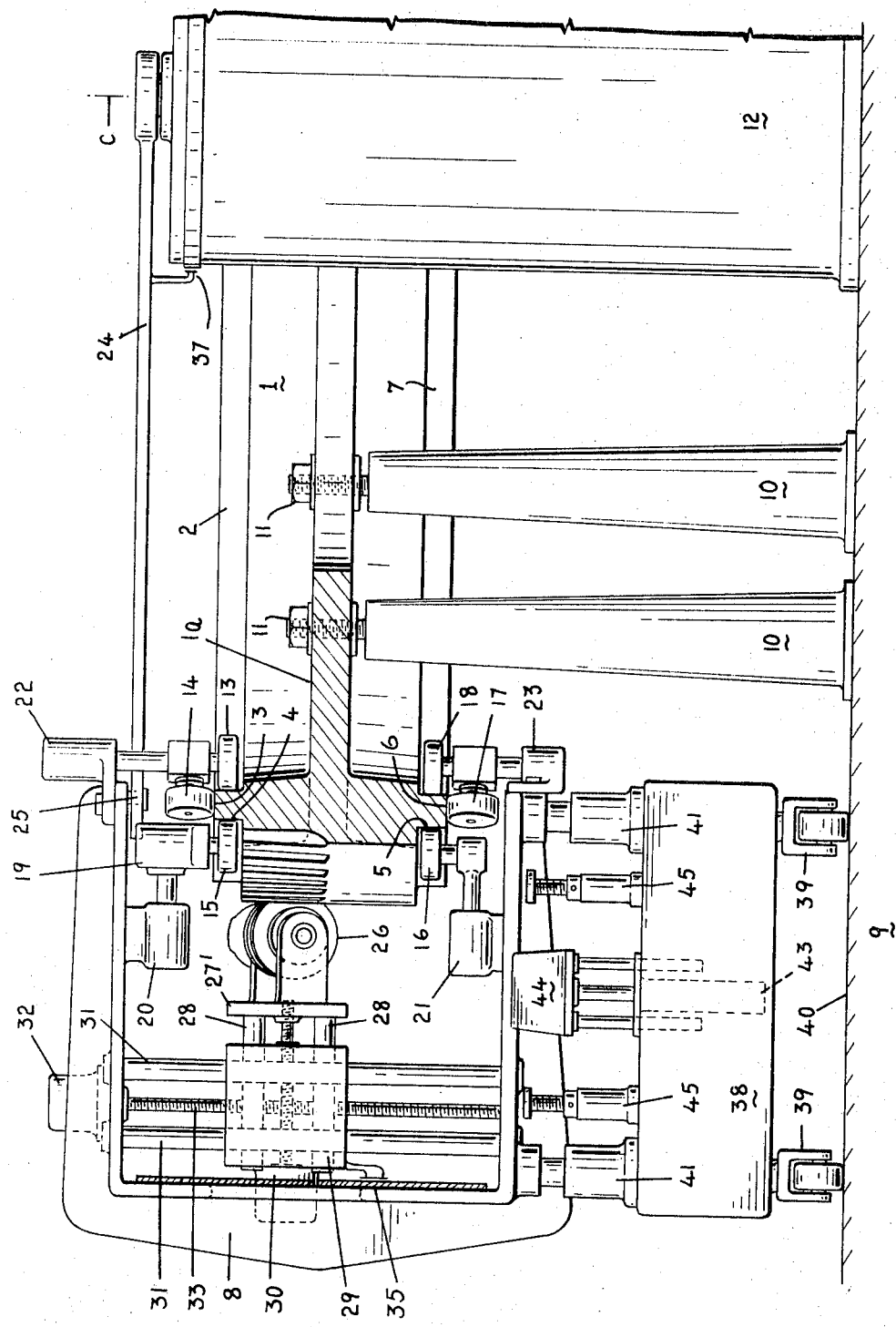
FIG. 1 is a part-sectional view showing a gear cutting machine operating on a large annular workpiece, the section being taken along a radius of the workpiece.

In the method of the present example the gear tooth profile is generated by hobbing, although the method may be used with other types of gear cutting. The method may be applied equally well to the cutting of straight spur gear teeth or helical gear teeth.

Referring to the drawing, an annular steel workpiece 1 having an inwardly directed flange 1a is produced by casting or by welded fabrication. After a preliminary machining operation in which the workpiece is machined to the required external diameter and in which coaxial annular surfaces 2, 3, 4, 5, 6 and 7 are machined, the workpiece is securely mounted upon a stationary mounting structure consisting of an annular arrangement of adjustable pedestals 10 secured to a concrete foundation 9. The inwardly directed flange 1a is bolted to the tops of the pedestals 10 by bolts 11 as shown.

The pedestals 10 are arranged coaxially with a cylindrical hub 12 defing a vertical axis C—C.

The system includes a machining assembly which is rotatable about the vertical axis C—C. The machining assembly includes a carriage 8, which is adapted to run on rollers 13, 14, 15, 16, 17 and 18, each of these rollers being one of a circumferentially spaced pair adapted to ride along one of the machined annular surfaces of the workpiece 1. As illustrated in the drawing, the pairs of rollers 13, 14, 15, 16, 17 and 18 are adapted to ride along the annular surfaces 2, 3, 4, 5, 6 and 7, respectively. The rollers 15 and 16 are driven from a hydraulic motor 19 through a variable speed drive mechanism, the rollers frictionally engaging the workpiece, or alternatively may be arranged to engage the annular surfaces positively. The carriage is thereby propelled circumferentially along the workpiece.

Hydraulic means are provided for adjusting the rollers so as to control the pressure of engagement between these rollers and the workpiece, and to eliminate radial play. Thus, the rollers 15, 16 can be adjusted radially by means of hydraulic motors 20, 21 while the rollers 13, 14, 17, 18 can be adjusted in a vertical direction by hydraulic motors 22, 23. As the carriage is propelled along the workpiece it rotates a radial indexing arm 24 which is connected to the carriage 8 by fitting 25 so that the position of the indexing arm 24 is always exactly related to the position of the carriage 8. The angular position of the indexing arm 24 is continuously monitored, and a signal is derived in accordance therewith by a suitable position determining means 37.

Mounted within the carriage 8 is a hob 26 driven from a hydraulic motor 27 through a variable speed drive. The hob 26 is connected to a rotational position sensor (not shown), which is adapted to provide in known manner a signal which corresponds to the exact rotational position of the hob relative to its own axis. As indicated in the drawing, additional drives are provided to advance the hob into the workpiece by the correct amount, according to conventional practice, on each revolution of the carriage 8.

Thus, the hob 26 is mounted on a rigid mounting 27', the latter being carried by radially extensible and retractable arms 28. The arms 28 are guided in a carriage member 29 and extened or retracted by means of a hydraulic motor 30 mounted on the carriage member 29. The carriage member 29 is itself guided for vertical movement by vertical guide arms 31 rigidly mounted in the carriage 8. Vertical movement of the carriage member is effected by a hydraulic motor 32 through a worm drive 33. The vertical position of the carriage member 29 in relation to the carriage 8 is continuously monitored by a suitable position sensing means 35, from which a position signal is derived.

The cutting teeth of the hob 26 are disposed in helical fashion, and since the hob is not free to move axially within the cutting head it is evident that for any given axial and circumferential position of the hob 26 relative to the workpiece 1, there can only be one corresponding rotational position for the hob. In cutting a gear with N teeth, a single lead hob will rotate exactly N times for one complete revolution of the cutting head on the blank. It is evident that the rotational position of the hob as related to its cutting position on the workpiece is a critical factor in the hobbing operation. The required position relationship may be secured by the use of a closed loop servo-control system, for example a rotary position control system of the type known by the trade mark "Inductosyn," the relationship being determined in accordance with a comparison of the signals from the position sensor 37 and the position sensor associated with the hob 26. As the drive motor 19 causes the carriage 8 to be propelled along the blank the speed and rotational position of the drive motor 27 are controlled so that the signal from sensor 37 matches the signal from the sensor of the hob 26.

Figure 3:
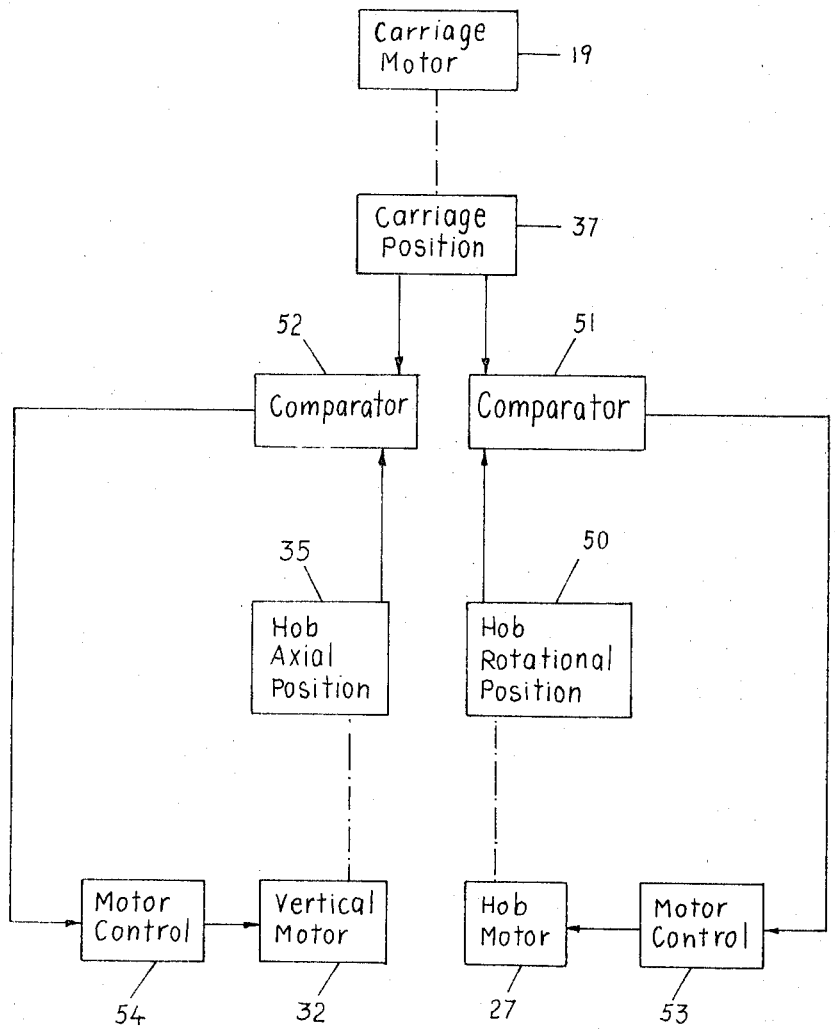
FIG. 3 is a simplified diagram illustrating the way in which the position of the cutting tool is controlled in relation to the workpiece.

In cutting the helical spur gears, it is most important to control continuously and very accurately the rotational position of the hob 26 in relation to the circumferential position of the carriage 8, and in relation to the vertical position of the carriage member 29. The circumferential position of the carriage 8, and hence the circumferential position of the hob in relation to the workpiece, is continuously monitored by the position sensing means 37, which provides a digital signal identifying the circumferential position. The vertical position of the carriage member 29, and hence the axial position of the hob in relation to the workpiece, is continuously monitored by the position sensing means 35, which provides a digital signal identifying said axial position. The rotational position of the hob is continuously monitored by a position sensing means indicated at 50, which provides a digital signal identifying said rotational position. In practice, since the circumferential position of the carriage 8 is the most difficult variable to control accurately, it is convenient to select this as the independent variable, the carriage speed being set so as determine the optimum hobbing speed. Having set the carriage speed, one utilizes the signal derived from position sensing means 37 to control the rotational and axial positions of the hob. This is achieved using two closed loop control systems as shown in FIG. 3.

By means of the position sensing means 37, a digital signal representative of the instantaneous carriage position is received. This signal is fed to each of two comparators 51,52 each of which is programmed to derive from the incoming signal a pattern signal representative of the required rotational position of the hob, in the case of comparator 51, or a pattern signal representative of the required axial position of the hob, in the case of comparator 52. Digital signals representative of the actual rotational and axial positions of the hob are derived from the position sensing means 50 and 35, respectively, and these are compared with the pattern signals to produce error signals indicative of any difference between the required and actual positions. The error signals are used to control motor control means 53,54 for controlling the motors 27,32 respectively, in known manner so as to adjust the rotational and axial positions in a sense to reduce the errors.

Instead of using a closed loop servo-control system the correct position relationship between the carriage and the hob may be secured by means of a shaft and gear assembly, of a conventional type, and in such a case errors due to elastic deflection of the shafting would be minimal on account of the relatively low inertial forces associated with movements of the carriage, as compared with the inertial forces that would arise if the workpiece itself were to be rotated, and also on account of the possibility of manufacturing the assembly using relatively short stiff shafts.

The carriage 8 may be constructed in two separable parts which may be raised and lowered respectively and secured together for mounting the carriage on the workpiece as shown. In the illustrated embodiment, however, the frame of the carriage 8 is in one piece and in order to disengage the machining assembly from the workpiece it is simply necessary to operate the hydraulic motors 22 and 23 so as to raise the rollers 13,14 and to lower the rollers 17,18 to disengage the rollers from the workpiece. The machining assembly can then be moved away from the workpiece in the radial direction. Conveniently the connection between the outer end of the indexing arm 24 and the fitting 25 may be a pin and slot connection which permits radial movement of the carriage relative to the indexing arm.

Figure 2:
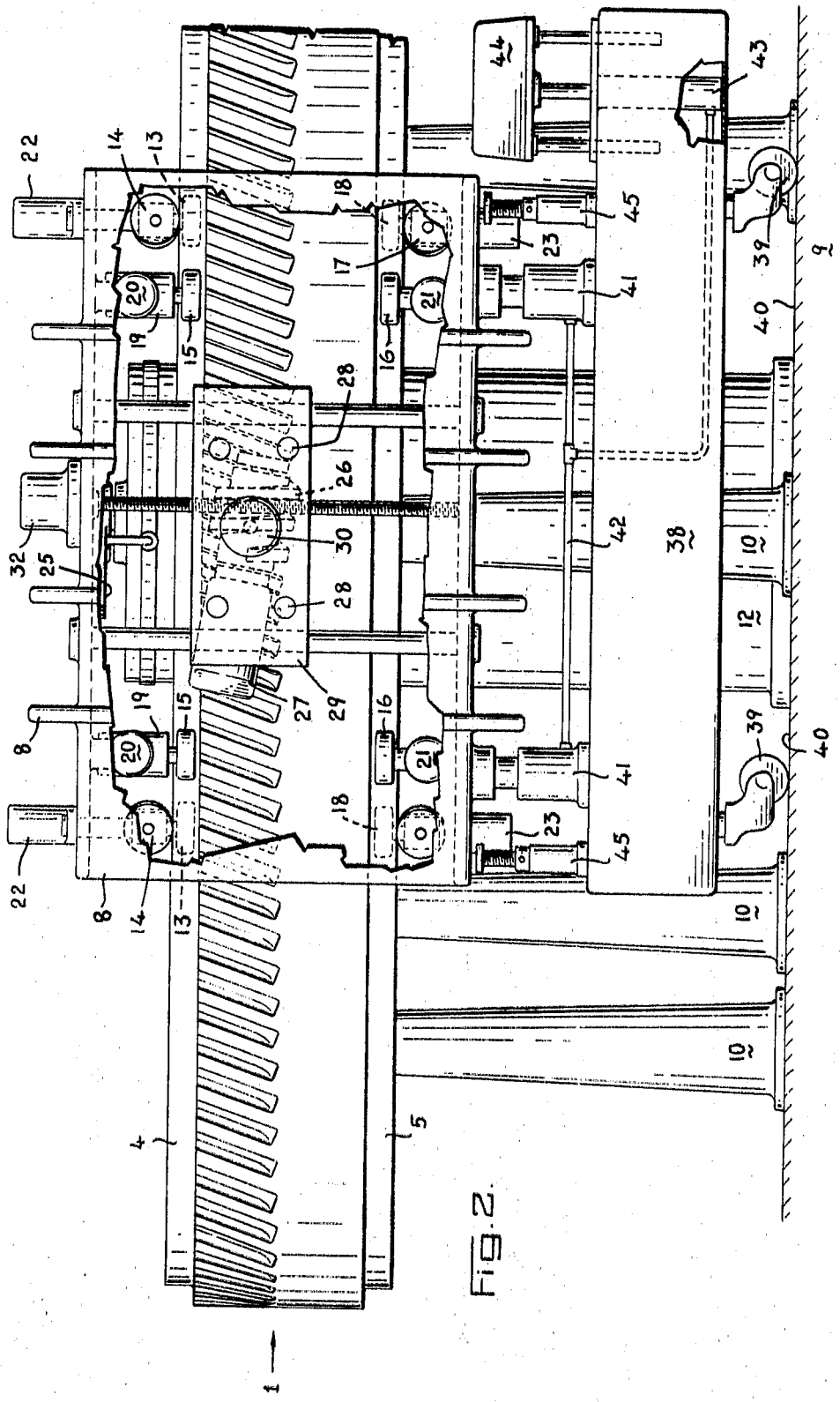
FIG. 2 is a side view of the system shown in FIG. 1, part of the gear cutting machine being broken away to show the cutting tool in relation to the workpiece.

Depending upon the size of the workpiece and the weight of the machining assembly, it may be necessary in certain cases to avoid load deflections in the workpiece by supporting the machining assembly on a wheeled support chassis. In FIGS. 1 and 2 there is shown a chassis 38 mounted on castors 39, the chassis being adapted to run on a base structure 40 which provides a horizontal annular carriageway coaxial with the stationary mounting structure of the system. The wheeled chassis is connected to the machining assembly so as to follow its circumferential movement precisely. Mounted on the chasis 38 are four hydraulic jacks 41 for supporting the carriage, the four hydraulic jacks 41 being connected by pipes 42 to a common hydraulic source 43 at a predetermined pressure. The hydraulic source 43 is itself a hydraulic cylinder having a piston which is weighted by a weight 44, adjustment of which adjusts the pressure in the jacks and hence their load-supporting capability. The purpose is to minimize the load on the workpiece itself which might deflect the workpiece. Adjustable screw jacks 45 are provided to support the machining assembly when it is not in operation, without transmitting undesirable forces due to unevenness or lack of parallelism between the plane surface 40 and the annular guide surfaces 3 and 6.

What I claim as my invention is:

1. A system for cutting gear teeth on a large annular workpiece, comprising a stationary mounting structure defining a vertical axis; means for securing the workpiece on the mounting structure in coaxial relation therewith; a carriage guided for movement along the face of the workpiece to be machined; means for propelling the carriage along the face of the workpiece; a gear cutting tool mounted in the carriage; and means for continuously controlling the position of the tool in relation to the carriage in accordance with the position of the carriage so as to ensure a predetermined path of movement of the tool with respect to the workpiece face, said means for continuously controlling the position of the tool comprising motor means mounted on the carriage and connected to the tool for moving the tool in relation to the carriage, position sensing means for sensing the position of the carriage on the workpiece, and motor control means responsive to said position sensing means for controlling said motor means.

2. A system according to claim 1, comprising means providing an annular carriage-way coaxial with the mounting structure, a wheeled chassis mounted on the carriage-way for movement therealong, and support means mounted on the chassis for engaging the carriage, said support means being adapted to support the carriage for minimizing the load exerted by the carriage on the annular workpiece.

3. A system for cutting gear teeth on a large annular workpiece, the workpiece providing a plurality of annular guide surfaces, a work face, and an annular securing flange, the system comprising:

a stationary mounting structure defining a vertical axis, means for securing the annular flange of the workpiece to the mounting structure in coaxial relation therewith, a carriage guided for movement along the workpiece, the carriage including a plurality of guide rollers positioned to engage said annular guide surfaces, drive means mounted on the carriage for propelling the carriage along the workpiece, a gear cutting tool mounted on the carriage, positioning means connected to the gear cutting tool for positioning the tool in relation to the work face, and control means responsive to the position of the carriage along the workpiece, said control means being operatively connected to said positioning means for continuously controlling the position of the tool in accordance with the position of the carriage, whereby to ensure a predetermined path of movement of the tool with respect to the face of the workpiece.

4. A system according to claim 3, wherein the stationary mounting structure comprises a foundation, and a plurality of support pedestals secured to the foundation, the support pedestals being disposed along a circle defining said vertical axis.

5. A system according to claim 3, wherein the drive means comprises a drive motor mounted on the carriage and coupled to one of the guide rollers, means being provided to maintain frictional engagement of the guide rollers with the respective guide surfaces.

6. A system according to claim 5, including a stationary hub positioned coaxially with the mounting structure, an indexing arm extending radially from the hub, the indexing arm being connected to the carriage so that the angular position of the indexing arm is determined by the carriage position, said control means being responsive to the angular position of the indexing arm.

7. A system according to claim 3, including a base structure defining a horizontal circular carriage-way coaxial with the mounting structure, a wheeled chassis mounted on the carriage-way for movement therealong, means connecting the wheeled chassis to the carriage, and adjustable support means mounted on the chassis and engaging the carriage in supporting relation thereto.

8. A system according to claim 7, wherein the adjustable support means comprises a plurality of hydraulic jacks connected to a common hydraulic source at a predetermined pressure.

9. A system according to claim 3, wherein the gear cutting tool is a hob.

10. A system according to claim 3, wherein the gear cutting tool is a milling cutter.

* * * * *